Sept. 19, 1967  ISAO YOSHIGAKI ET AL  3,342,079
SPEED CHANGE DEVICES FOR AGRICULTURAL TRACTORS
Filed April 15, 1965   3 Sheets-Sheet 1
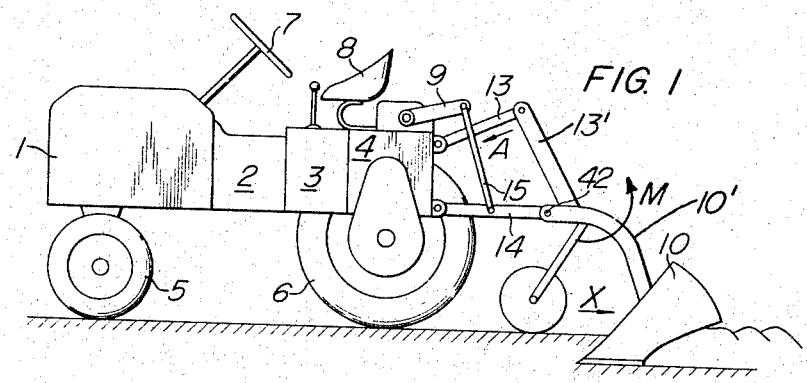
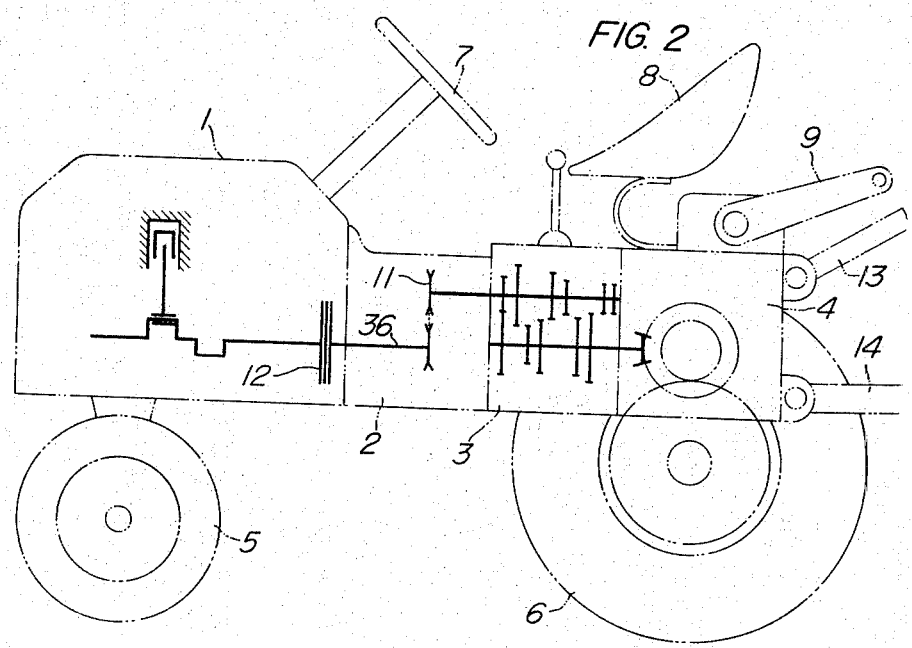
INVENTORS
Isao Yoshigaki
Toshiro Azuma
BY *Stevens, Davis, Miller & Mosher*
ATTORNEYS

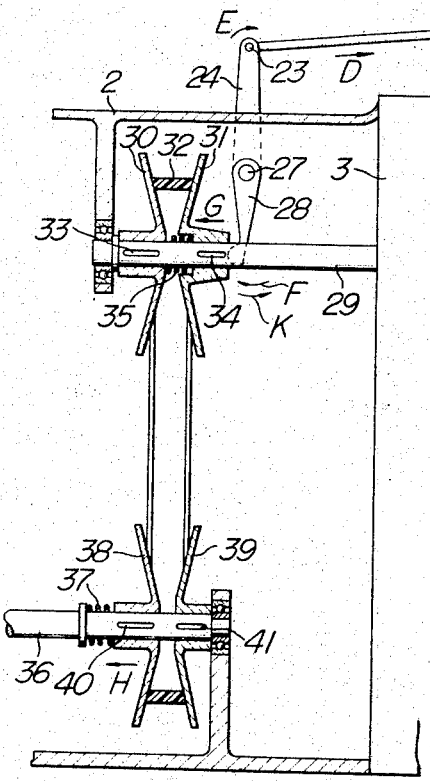
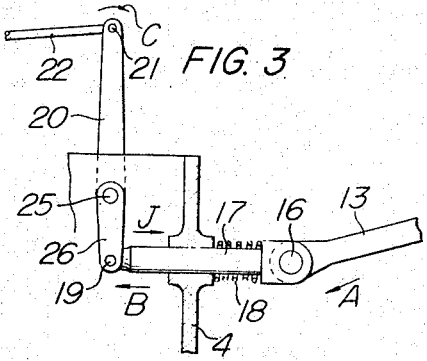
FIG. 3
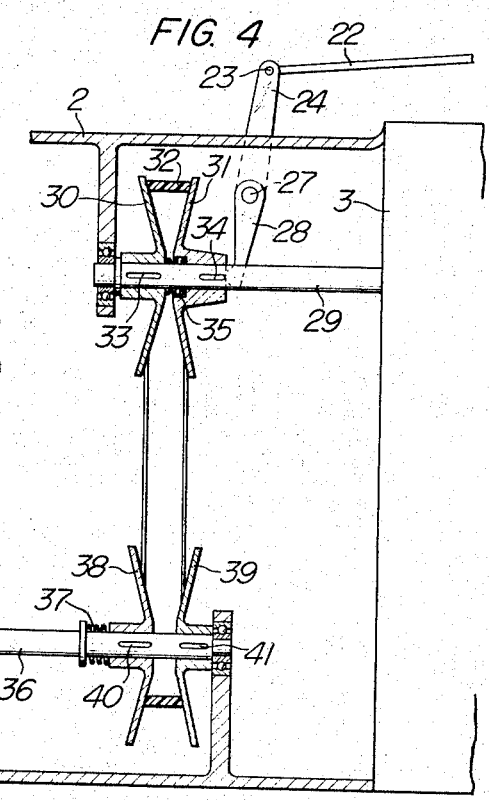
FIG. 4
INVENTORS
*Isao Yoshigaki*
*Toshiro Azuma*
BY *Stevens, Davis, Miller & Mosher*
ATTORNEYS

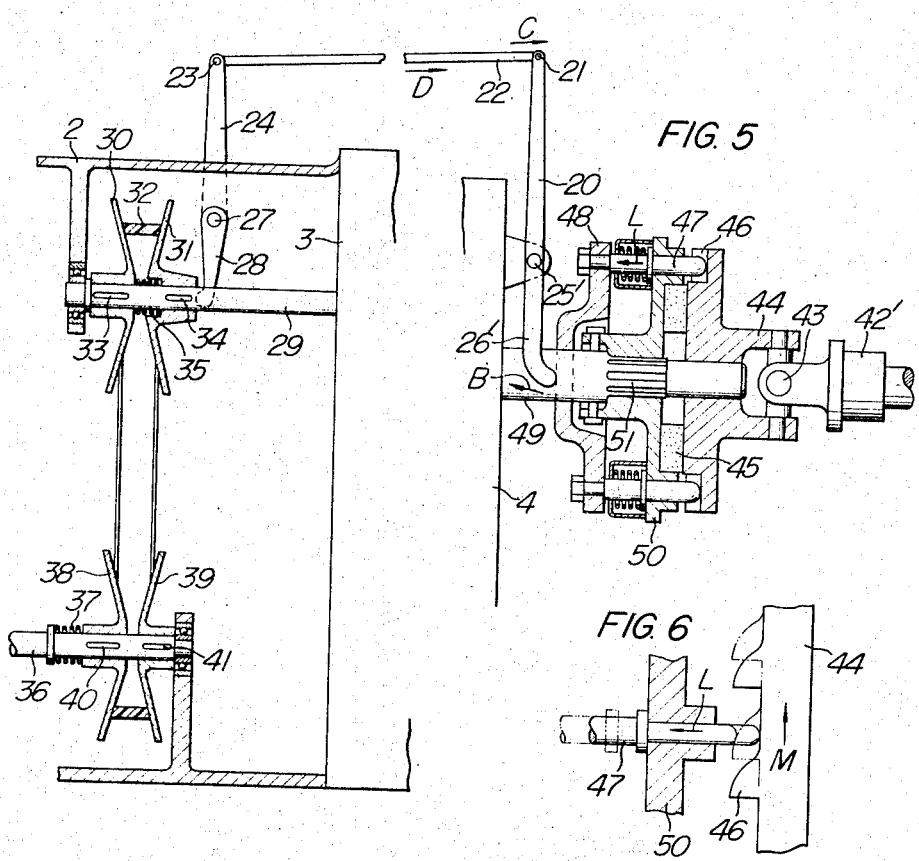

United States Patent Office 3,342,079
Patented Sept. 19, 1967

3,342,079
SPEED CHANGE DEVICES FOR AGRICULTURAL TRACTORS
Isao Yoshigaki, Nishinomiya-shi, and Toshiro Azuma, Osaka, Japan, assignors to Tadao Yamaoka, Ashiya-shi, Japan, a manufacturer of Japan
Filed Apr. 15, 1965, Ser. No. 448,456
Claims priority, application Japan, Sept. 29, 1964, 39/54,756
6 Claims. (Cl. 74—230.17)

ABSTRACT OF THE DISCLOSURE

An agricultural tractor arranged with a tilling implement coupled thereto, wherein movement of a displaceable member in the coupling means between the tractor and the implement is transmitted in response to the load on the implement to a speed change means disposed in the power transmission path from the tractor engine to the tractor wheels, and when a rotary implement is used, to the tractor wheels and to the power take-off shaft for driving the same, so as to actuate the speed change means to automatically change the speed of rotation of the wheels and the power take-off shaft.

---

The present invention relates to agricultural tractors and more particularly to a new and improved type of speed change device which is adapted to automatically provide an optimum speed of rotation of the tractor axle or power take-off shaft depending on a particular load on a working implement when such working implement is coupled to the tractor for tilling operation.

In a ploughing operation, for example, with a plow coupled to an agricultural tractor, the breadth and depth of soil to be ploughed by the plow as well as working speed thereof are generally made maximum as far as the output of an engine mounted on the tractor permits in order to obtain a best working efficiency. When, under such operating conditions, the soil condition of a field varies and the power required for the ploughing becomes excessively greater than the engine output, the number of revolutions of the engine is forced to reduce and the engine may sometimes be forced to stop. In order to eliminate the above-described trouble, several manners of control have hitherto been widely practiced which include a manner of control according to which a lever or like means is fitted to the plow so that the plow can slightly be lifted when it encounters a hard portion of soil to thereby reduce the power requirement for ploughing, and a manner of control according to which the main clutch is disengaged and then the main change lever is shifted to a next lower position so that the ploughing operation can be made at a slower working speed. However, the former method has been quite unsatisfactory in that it is very difficult to effect an optimum degree of lever operation and repeated lifting and lowering movement of the plow results in many cases in the fluctuation of tilled depth. On the other hand, the latter method has been attended with a remarkably low working efficiency due to troublesome operation involved therein because the tractor body is caused to stop whenever the main clutch is disengaged and the main change lever must simultaneously be shifted during the ploughing operation.

Therefore, the primary object of the present invention is to provide a speed change device for an agricultural tractor which is operative in a manner that the number of revolutions of the tractor axle or the power take-off shaft is automatically varied in response to a particular load exerted on a working implement coupled to the tractor so that the tilling operation can be effected at a working speed suitable to the magnitude of the load on the working implement.

According to the present invention, there is provided a speed change device for an agricultural tractor arranged for tilling operation with a working implement coupled thereto, comprising speed change means disposed in the power transmission path from the tractor engine to the tractor wheel axle, means operative in response to any variation of a load on said working implement, and means operatively associated with said load responsive means for urging said speed change means to a different operative position whereby the number of revolutions of the tractor wheel axle can automatically be varied to a speed suitable to the magnitude of the particular load on said working implement.

According to the present invention, there is also provided a speed change device for an agricultural tractor arranged for tilling operation with a working implement coupled thereto, comprising speed change means disposed in the power transmission path from the tractor engine to the power take-off shaft, means operative in response to any variation of a load on said working implement, and means operatively associated with said load responsive means for urging said speed change means to a different operative position whereby the number of revolutions of the power take-off shaft can automatically be varied to a speed suitable to the magnitude of the particular load on said working implement.

There are other objects and particularities of the present invention which will become obvious from the following description with reference to the accompanying drawings, in which:

FIG. 1 is a side elevational view of an agricultural tractor provided with the speed change device according to the present invention, the view showing the tractor working with a plow coupled thereto;

FIG. 2 is a view diagrammatically showing the power transmission path in the tractor of FIG. 1, the tractor being outlined by chain lines and shown in a somewhat enlarged scale;

FIG. 3 is an enlarged vertical sectional view of parts of the speed change device embodying the present invention in one operative position;

FIG. 4 is a view substantially similar to FIG. 3, but showing the device in another operative position;

FIG. 5 is an enlarged vertical sectional view of another embodiment of the present invention, the view showing a case in which a rotary implement is coupled to the tractor; and FIG. 6 is an enlarged view of parts of the device shown in FIG. 5.

The present invention will first be described with regard to a case in which a plow is coupled to the rear end of the tractor and the inventive device is disposed in the power transmission path between the main clutch and the transmission gearing.

Referring to FIGS. 1 and 2, reference numeral 1 designates an engine; 2, a main clutch casing; 3, a transmission gearing; 4, a final reduction gear casing; 5, a front wheel; 6, a rear wheel; 7, a steering handle; 8, a driver's seat; 9, an arm for causing vertical movement of a plow 10; 11, a stepless speed change means disposed in the power transmission path between a main clutch 12 and the transmission gearing 3, that is, in the main clutch casing 2; 13, an upper arm of a three point supporting system; 14, a lower arm of the three point supporting system; and 15, a connecting rod between the lifting and lowering arm 9 and the lower arm 14.

Power is transmitted from the engine 1 through the main clutch 12 to the stepless speed change means 11, thence through the transmissioin gearing 3 to the final reduction gear casing 4 to drive the rear wheels 6. According to the embodiment, the stepless speed change means 11 is illustrated as a V-pulley type stepless speed change means of variable diameter, as shown in FIG. 3. In FIG. 3, the stepless speed change means 11 comprises a pair of V-pulleys, that is, a driving V-pulley consisting of a slidable sheave 38 and a stationary sheave 39 mounted on a driving shaft 36 by keys 40 and 41, respectively, and a driven V-pulley consisting of a stationary sheave 30 and a slidable sheave 31 mounted on a driven shaft 29 by keys 33 and 34, respectively. The power transmitted through the main clutch 12 to the driving V-pulley by the shaft 36 is transmitted to the driven V-pulley by means of a V-belt 32 and then transmitted to the transmission gearing 3 through the shaft 29.

Suppose now that the outside end of the slidable sheave 31 of the driven V-pulley is forced in a direction of arrow G by a lever 28. Then, by the sliding movement of the slidable sheave 31 towards the stationary sheave 30, the breadth of the V-groove between the sheaves 30 and 31 is narrowed so that the diameter of the V-pulley at which the V-belt 32 contacts the sheaves 30 and 31 is made greater. As a result, the diameter of the driving V-pulley at which the V-belt 32 contacts the sheaves 38 and 39 are forced to become smaller. The slidable sheave 38 therefore is urged away from the stationary sheave 39 in a direction of arrow H against the force of a helical spring 37. Thus, the stepless speed change means 11 takes a position as shown in FIG. 4. Since in this operative position the pulley diameter on the driving side is small and the pulley diameter on the driven side is large, the number of revolutions of the driving shaft 36 is reduced at the driven shaft 29.

Then, when the lever 28 is moved in a direction of arrow K in FIG. 3, the slidable sheave 31 of the driven pulley is urged by a helical spring 35 in a direction opposite to arrow G away from the stationary sheave 30 so that the breadth of the V-groove between the sheaves 30 and 31 becomes greater. Operation in this case is entirely opposite from the above-described operation and the pulley diameter at which the V-belt 32 contacts the sheaves 30 and 31 becomes smaller. As a result thereof, the slidable sheave 38 of the driving V-pulley is urged by the spring 37 in a direction opposite to the direction of arrow H toward the stationary sheave 39 so that the pulley diameter at which the V-belt 32 contacts the sheaves 38 and 39 becomes greater. Since in this operative position the pulley diameter on the driving side is great and the pulley diameter on the driven side is small, the number of revolutions of the shaft 29 is increased with respect to the driving shaft 36 opposite from the case previously described.

With the power transmission system arranged as described above, suppose a ploughing operation is carried out with the transmission gearing 3 set at a suitable transmission ratio. A load in a direction of arrow X as shown in FIG. 1 will be exerted on the plow 10 due to the resistance of soil. In the three point support system, the lower rod 14 is held in a fixed position by being supported with arm 9 and connecting rod 15, and the action of moment M generated by load X causes the plow 10 to rotate upwardly around its pivot point 42. As a rod 13′, pivotally connected with the upper rod 13, is integrally connected with a plow on 10′, the rotation of the plow applys a load to the upper rod 13 in a direction of arrow A. The front end of the upper rod 13 is connected by a pin 16 to the rear end of a rod 17 slidably supported in the wall of the final reduction gear casing 4. A helical spring 18 is mounted about the rod 17 between the rear end of the rod 17 and the wall of the final reduction gear casing 4 to normally balance the load applied to the upper rod 13.

Suppose now the soil condition varies and the plow 10 encounters a soil resistance more than a certain value. In this case, the upper rod 13 is urged in the direction of arrow A as described above. Therefore, the rod 17 slidably supported in the wall of the final reduction gear casing 4 and having its front end connected to an arm 26 by a pin 19 is urged in a direction of arrow B against the force of the spring 18 to thereby cause movement in a direction of arrow C of the upper end of a lever 20, which lever is integral with the arm 26 and is pivotally mounted on the wall of the final reduction gear casing 4 by a pivot pin 25. The upper end of the lever 20 is connected by a pin 21 to one end of a rod 22 the other end of which is connected by a pin 23 to the upper end of a lever 24. The lever 24 is pivotally mounted on the wall of the main clutch casing 2 by a pivot pin 27, and a lever 28 in the main clutch casing 2 is integrally connected with the lever 24 so as to be pivotal about the same pin 27. Therefore, the movement of the lever 20 in the direction of arrow C causes movement of the rod 22 in a direction of arrow D and resulting movement of the lever 24 in a direction of arrow E. The pivotal movement of the lever 24 about the pin 27 causes the free end of the lever 28 to move in a direction of arrow F to thereby urge the slidable sheave 31 towards the stationary sheave 30. By the movement of the slidable sheave 31 in the direction of arrow F, that is, in the direction of arrow G, the pulley diameter at which the V-belt 32 contacts the sheaves 30 and 31 becomes greater as described previously and shown in FIG. 4 and the speed of traction can thereby be reduced. Then when the resistance against the plow 10 is decreased, the rod 17 is urged in a direction of arrow J by the force of the helical spring 18 and the above-described operation is reversed. In this case, the pulley diameter at which the V-belt 32 contacts the sheaves 30 and 31 becomes smaller and the speed of traction is increased.

Another embodiment of the present invention will next be described with regard to a case of the combination of an agricultural tractor and a rotary tilling implement in which the rotary implement is coupled to the tractor for being driven by a power take-off shaft of the tractor. FIG. 5 shows in vertical section a stepless speed change means 11 and means associated therewith to control the stepless speed change means 11 in response to variation of load on the power take-off shaft. The tractor structure in the second embodiment is entirely similar to that shown in FIG. 1 except that the power take-off shaft 49 is additionally provided to drive the rotary implement and therefore like reference numerals appearing in FIG. 1 are used in FIG. 5 to designate like parts.

The power take-off shaft 49 is splined near its rear end as at 51 and a disk-like member 50 is in spline engagement with the splined portion 51. An annular resilient member 45 is firmly fixed to the disk-like member 50. A disk-like member 44 is further fixed to the resilient member 45 and is connected to a power transmission shaft 42′ of a rotary tilling implement (not shown) by a pin 43. Therefore, the power from the tractor engine is transmitted through the power take-off shaft 49, disk-like member 50, resilient member 45, disk-like member 44 and transmission shaft 42′ to the rotary tilling implement. The resilient member 45 is subjected to torsion by the driving power being transmitted therethrough and this torsion causes displacement of the disk-like member 44 relative to the disk-like member 50. A plurality of pins 47 are loosely fitted in axial bores provided near the outer periphery of the disk-like member 50 and are normaly urged by helical springs against cam-like projections 46 on the disk-like member 44. The relation between the pin 47 and the cam-like projection 46 is best shown in FIG. 6 in which arrow M shows a direction in which the disk-like member 44 is displaced relative to the disk-like member 50. It will be seen that, by the relative displacement between the disk-like members 44 and 50, the pins 47 are urged by the respective cam-like projections 46 in a direction of arrow L.

An amount of torsion of the resilient member 45 is dependent upon the magnitude of the driving power being transmitted. In other words, a greater load on the rotary tilling implement causes more movement of the pins 47 in the direction of arrow L. Opposite ends of the pins 47 are firmly supported in a disk-like member 48. Therefore, the movement of the pins 47 in the direction of arrow L causes corresponding movement of the disk-like member 48 in the same direction. This displacement of the disk-like member 48 urges one end of a lever 26' pivotally supported by a pin 25' on a final reduction gear casing 4 to cause the opposite end of the lever 26' to move in a direction of arrow C. Operation thereafter of the device is exactly as described with regard to the first embodiment of the present invention and thus the tractor wheel axle and the power take-off shaft are now driven at a reduced number of revolutions. When the driving load is subsequently decreased, the amount of torsion of the resilient member 45 is also decreased and the disk-like members 50 and 44 retake their original positions relative to each other. Thus, the pins 47 and the above-described mechanism actuated by the pins 47 are all restored to their normal operative positions. The tilling operation therefore is continued at the original speed.

It will be understood from the foregoing description that, in any case of ploughing operation with a plow and tilling operation with a rotary tilling implement, the operation can be carried out at a working speed suitable to the magnitude of a particular load on the implement. It will further be understood that any other stepless speed change means than that illustrated by numeral 11 may be employed to attain the same effect and a hydraulic system may be employed to control the stepless speed change means in lieu of the mechanical system illustrated herein.

What is claimed is:

1. In an agricultural tractor for tilling the soil having, a frame, a tilling implement, coupling means connecting said tilling implement to said frame, wheels supporting said frame, and an engine, a power transmission connected to said engine and at least one of said wheels comprising, speed chage means, said coupling means including a displaceable member responsive to variations of load on said tilling implement, and means connected between said displaceable member and said speed change means for controlling said speed change means whereby said wheels are rotated at a predetermined speed in accordance with the amount of load on said implement.

2. An apparatus as defined in claim 1, wherein said speed varying means includes a drive shaft and a driven shaft of variable effective diameter, a driving pulley mounted on said drive shaft driven by said engine, a driven pulley of variable effective diameter mounted on said driven shaft, each of said driving and driven pulleys including an axially movable side and an axially fixed side formed to vary the effective diameter of the respective pulley in response to relative axial displacement of said movable and fixed sides, said movable and fixed sides of each of said pulleys being held against rotation relative to each other, a transmission belt of fixed length trained around said driving and driven pulleys, first spring means operative to continuously urge the movable side of said driving pulley axially toward said fixed side of the driving pulley, second spring means operative to continuously urge said movable side of the driven pulley axially away from said fixed side of the driven pulley, said means connected between said displaceable member and said speed change means including a pivotally mounted lever in contact with said movable side of said driven pulley resisting the force of said second spring means and thereby determining the ratio between the diameter of the driving pulley and that of the driven pulley.

3. An apparatus as defined in claim 2, wherein said tilling implement is pivotally mounted on said frame by said coupling means.

4. In an agricultural tractor for tilling soil having, a frame, wheels supporting said frame, an engine, a rotary tilling implement, a power take-off shaft, and coupling means connecting said rotary tilling implement to said frame, a power transmission comprising speed change means connected to said engine, at least one of said wheels and said power take-off shaft, said coupling means including a displaceable member responsive to variations of load on said tilling implement, and means connected between said displaceable member and said speed change means for controlling said speed change means whereby said wheels are rotated at a predetermined speed in accordance with the amount of load on said implement.

5. An apparatus as defined in claim 4, wherein said speed varying means includes a drive shaft and a driven shaft of variable effective diameter, a driving pulley mounted on said drive shaft driven by said engine, a driven pulley of variable effective diameter mounted on said driven shaft, each of said driving and driven pulleys including an axially movable side and an axially fixed side formed to vary the effective diameter of the respective pulley in response to relative axial displacement of said movable and fixed sides, said movable and fixed sides of each of said pulleys being held against rotation relative to each other, a transmission belt of fixed length trained around said driving and driven pulleys, first spring means operative to continuously urge the movable side of said driving pulley axially toward said fixed side of the driving pulley, second spring means operative to continuously urge said movable side of the driven pulley axially away from said fixed side of the driven pulley, said means connected between said displacement member and said speed change means including a pivotally mounted lever in contact with said movable side of said driven pulley resisting the force of said second spring means and thereby determining the ratio between the diameter of the driving pulley and that of the driven pulley.

6. An apparatus as defined in claim 5, wherein said coupling means includes a torque responsive device connected to said power take-off shaft for activating said displaceable member.

References Cited

UNITED STATES PATENTS 2,658,399   11/1953   Mercier _____ 74—230.17

DONLEY, J. STOCKING, *Primary Examiner.*

DAVID J. WILLIAMOWSKY, *Examiner.*

L. H. GERIN, *Assistant Examiner.*